United States Patent
Srinivasan et al.

[11] Patent Number: 6,147,962
[45] Date of Patent: Nov. 14, 2000

[54] DATA STORAGE CARTRIDGE HAVING A RESTRAINING MECHANISM

[76] Inventors: Thiruppathy Srinivasan, 1358 N. 12th St., Apt. 301, Wahpeton, N. Dak. 58075; Chad R. Sandstrom, 212 W. Cherry St., Stillwater, Minn. 55082; Douglas R. Plourde, Box 566, Hwy. 35-64, Somerset, Wis. 54025; Brian T. Bonn, 789 Sugar Pine Rd., Scotts Valley, Calif. 95066

[21] Appl. No.: 08/979,821

[22] Filed: Nov. 26, 1997

[51] Int. Cl.⁷ .................................................. G11B 23/03
[52] U.S. Cl. .......................... 369/291; 369/264; 360/133
[58] Field of Search ..................... 369/208, 258, 369/261, 263, 264, 270, 271, 282, 289, 290, 291; 360/96.5, 99.05, 99.08, 99.12, 132, 133

[56] References Cited

U.S. PATENT DOCUMENTS

| | | | |
|---|---|---|---|
| 3,529,301 | 9/1970 | Hiruta . | |
| 3,836,096 | 9/1974 | Fukushima et al. | 360/132 |
| 3,857,531 | 12/1974 | Jantzen | 360/133 |
| 3,987,489 | 10/1976 | Schoettle et al. | 360/133 |
| 4,394,700 | 7/1983 | Edwards | 360/133 |
| 4,399,480 | 8/1983 | Edwards | 360/132 |
| 4,459,628 | 7/1984 | Barton | 360/133 |
| 4,550,355 | 10/1985 | Larson et al. | 360/133 |
| 4,559,575 | 12/1985 | Noto et al. | 360/133 |
| 4,571,718 | 2/1986 | Cahill et al. | 369/291 |
| 4,581,667 | 4/1986 | Gerfast | 360/133 |
| 4,608,617 | 8/1986 | Oishi et al. | 360/133 |
| 4,636,904 | 1/1987 | Matsuno | 360/133 |
| 4,688,127 | 8/1987 | Oishi et al. | 369/291 |
| 4,692,831 | 9/1987 | Suzuki | 360/133 |
| 4,775,115 | 10/1988 | Gelardi | 242/348.2 |
| 4,811,115 | 3/1989 | Kanazawa et al. | 360/133 |
| 4,879,621 | 11/1989 | Chamberlin et al. | 360/133 |
| 4,899,244 | 2/1990 | Morse | 360/133 |
| 4,908,817 | 3/1990 | Sandell et al. | 369/291 |
| 4,943,880 | 7/1990 | Muehlhausen et al. | 360/133 |
| 5,027,249 | 6/1991 | Johnson et al. | 360/132 |
| 5,128,818 | 7/1992 | Koizumi et al. | 360/99.12 |
| 5,181,153 | 1/1993 | Nishimura | 360/132 |
| 5,209,425 | 5/1993 | Krabbenhoft et al. | 242/348.2 |
| 5,381,402 | 1/1995 | Lee et al. | 369/291 |
| 5,481,420 | 1/1996 | Cardona et al. | 360/99.06 |
| 5,535,081 | 7/1996 | Nelson et al. | 360/133 |
| 5,650,899 | 7/1997 | Schick et al. | 360/133 |
| 5,691,860 | 11/1997 | Hoppe | 360/97.02 |

FOREIGN PATENT DOCUMENTS

| | | |
|---|---|---|
| 0 497 604 A2 | 5/1982 | European Pat. Off. . |
| 0 352 918 A2 | 4/1989 | European Pat. Off. . |
| 0 516 329 A2 | 2/1992 | European Pat. Off. . |
| 0 553 035 A2 | 1/1993 | European Pat. Off. . |
| 0 588 219 A2 | 3/1994 | European Pat. Off. . |
| 0 747 900 A1 | 12/1996 | European Pat. Off. . |
| 60-015874 | 1/1985 | Japan . |

*Primary Examiner*—David L. Ometz
*Attorney, Agent, or Firm*—Dicke, Billig & Czaja, P.A.

[57] ABSTRACT

A data storage cartridge having a data storage disc locking/restraining mechanism. The data storage cartridge includes a shell defined by a cover and a base, within which a disc and the restraining mechanism are disposed. The restraining mechanism operates to restrain the central portion of the data storage disc against the shell when the data storage disc is in a non-operating position. When the data storage disc is in an operating position, the restraining mechanism is disengaged from restraining the disc by the drive spindle independent of a shutter mechanism.

27 Claims, 10 Drawing Sheets

DATA STORAGE CARTRIDGE HAVING A RESTRAINING MECHANISM

BACKGROUND OF THE INVENTION

The present invention relates to a data storage cartridge for storing disc player-readable data on a media. More particularly, it relates to a disc cartridge having a restraining or locking mechanism for securing a disc within the disc cartridge when the disc is not in use.

Data storage cartridges are universally accepted devices for distributing, storing and accessing large volumes of data. In its most basic form, a data storage cartridge is comprised of an outer shell which maintains and protects a disc or disc substrate. Typically, the shell includes a sliding door through which the disc is accessed. The disc substrate can assume different forms, such as a magnetic disc or an optical data disc. Regardless of specific media type, the disc substrate will receive and/or store data accessible/readable by a disc player. This data can assume a wide variety of forms, such as CAD, games, spread sheets, music, word processing, etc.

To access data from or record information to a disc, the data storage cartridge is inserted into a disc drive. A conventional disc drive includes a drive spindle and head. The drive spindle engages the disc cartridge while a portion of the disc substrate is exposed to the head or disc reader. As the drive spindle rotates the disc within the shell, the head is able to "read" or "write" information to or from the disc substrate.

Technology associated with computers, and, in particular, data storage discs, has rapidly evolved. Optical discs have exponentially greater data storage capacities than previous media. Formats of optical data discs include audio CD (compact disc), CD-R (CD-Recordable), CD-ROM (CD-Read Only Memory), DVD (digital versatile disc or digital video disc) media, DVD-RAM (random access memory), various types of rewritable media, such as magneto-optical (MO) discs, and phase change optical discs. Even with the advancement of technology, however, the same general principles apply; namely, the disc cartridge is comprised of a shell surrounding a disc.

While technology associated with the actual disc media has evolved, the general configuration of the data storage cartridges has not. The standard data storage cartridge design is highly serviceable, but may present substantial quality control issues. In particular, while the shell serves to protect the disc from many potential hazards, nothing protects the disc from the shell itself. In other words, the shell virtually encompasses the disc and is preferably made of a hardened material. Thus, when the data storage cartridge is not in use, the shell protects the enclosed disc from possible damage due to scratching, oils, etc. normally encountered during handling. However, the disc may be relatively unconstrained within the shell. The disc can move in both an axial and radial direction. Thus, unless great care is taken when handling the data storage cartridge, abrupt movements of the data storage cartridge cause the disc to shift within the shell. The disc is free to strike the cover, base or sides of the shell. As the disc substrate is highly sensitive, these movements may cause damage to the disc. Further, movements of the disc inside the shell may also cause rattle sounds which compromises a user's perception of cartridge integrity and quality.

Attempts have been made to address the above-described problem. For example, known magnetic and optical disc cartridges include an arm that applies a radial restraining force against the outer diameter of the disc. Such a mechanism does not protect well against the up and down motion of the disc, which is a major source of disc rattle. Biasing the optical disc substrate along an outer edge of the disc into contact with a side wall of the shell may damage a portion of the formatted area of the substrate.

Further, some magnetic and optical data storage cartridge restraining mechanisms are activated when the cartridge door is closed and released when the cartridge door is open, allowing for the disc to flop and rattle in the cartridge when the user opens the door under handling. Once the disc cartridge is placed within a disc drive, the shell sliding door is opened, disengaging the restraining mechanism. In this condition, when the drive spindle is not engaged with the disc, the disc substrate may rattle and/or even dislocate the disc significantly within the shell due to vibrations and shock seen by the disc drive. Further, with a drive mounted on its side, once the cartridge sliding door is open, the now-released disc substrate is free to fall to one side, possibly compromising disc alignment and disc surface integrity.

It is desirable to have a locking mechanism for securing and protecting a disc when the disc is not in use, without damaging the integrity of the data located on the disc. It is desirable to have a data storage cartridge having a locking mechanism which restrains movement of the disc in a direction perpendicular to the data surface and also in a radial direction. It is desirable to have a data storage cartridge including a locking mechanism which, when located within a side mounted drive, prevents the disc from flopping to one side. Further, there is a need for a disc cartridge having a locking mechanism which inherently provides for tight sealing of the disc data surface from error and debris flow when the data storage cartridge is not engaged with the disc player drive spindle. Therefore, a substantial need exists for a disc cartridge having an locking mechanism for securing and protecting the disc when not in use.

SUMMARY OF THE INVENTION

The present invention is a data storage cartridge having a locking mechanism for securing and protecting a data storage disc located therein, when the data storage disc is not in use, without damaging the integrity of the data located on the data storage disc. The locking mechanism restrains movement of the data storage disc in a direction perpendicular to the data surface (axially) and also in a radial direction. When the data storage cartridge is located within a side mounted drive, the locking mechanism prevents the data storage disc from falling to one side. The locking mechanism inherently provides for tight sealing of the disc data surface from dust and debris contamination when the data storage cartridge is not engaged with the disc drive spindle.

In one exemplary embodiment, the present invention provides a data storage cartridge for use with a drive having a drive spindle. The data storage cartridge includes a shell defined by a cover and a base. A data storage disc is maintained within the shell between the cover and the base, the data storage disc including a central portion. A restraining mechanism operably positioned within the data storage cartridge operates to restrain the central portion of the data storage disc against the shell when the data storage disc is in a non-operating position. When the data storage disc is in an operating position, the restraining mechanism is disengaged from restraining the disc by the drive spindle independent of a shutter mechanism. The drive spindle may continuously contact the restraining mechanism during operation of the drive spindle.

The restraining mechanism axially and radially restrains the data storage disc within a shell. The restraining mechanism may include a spring mechanism operably positioned between the data storage disc and the shell for biasing the data storage disc against the shell when the data storage disc is in the non-operating position. The data storage disc may include a disc substrate having a center hole, and a hub located at the center hole, wherein the restraining mechanism contacts the disc substrate. In another exemplary embodiment, the restraining mechanism contacts the hub. In one application, the spring mechanism is mechanically coupled to the shell cover, and the spring mechanism biases the central portion of the data storage disc against the base of the shell.

In another exemplary embodiment, the present invention provides a data storage cartridge for use in a disc drive having a drive spindle to store information on a data storage disc. The data storage cartridge includes a shell defined by a cover and a base. A data storage disc is maintained within the shell, the data storage disc having a top surface and a bottom surface. A tension plate is operably positioned within the shell, wherein the retention plate is configured to selectively contact the data storage disc. Spring means are operably coupled to the retention plate for biasing the retention plate into contact with the data storage disc such that in a first, non-operating position, the retention plate secures the disc substrate to the base, and in a second, operating position, the drive spindle operably engages the retention plate such that the retention plate releases the data storage disc from the base, independent of a shutter mechanism. In one embodiment, the retention plate is generally cup shaped.

The cover may include a spring mounting means for maintaining an end of the spring means. The spring mounting means may be an annular flange extending from the cover toward the base. The annular flange may be centrally disposed on the cover. The annular flange may be configured to frictionally maintain the spring means.

The base may include an annular wall for selectively maintaining a portion of the bottom surface of the data storage disc. The annular wall may extend from the base toward the cover.

In one exemplary embodiment, the data storage disc is an optical recording media. The data storage disc may further include an alignment mechanism for registering the data storage disc with respect to the drive spindle.

The base may include a central opening for allowing the drive spindle to interact with the data storage disc. The drive spindle may further include a hub attached to the bottom surface of the data storage disc, wherein the hub is configured to extend into the central opening in the base. The data storage disc may include a center hole which is configured for axial alignment with the central opening of the base, and further wherein the retention plate is a disc-shaped body having an outer region for contacting the disc substrate and a central region aligned with the center hole in the data storage disc. The central region of the retention plate may form an upper recess for maintaining a portion of the spring means and a shoulder configured to extend into the center hole of the data storage disc in the non-operating position. The shoulder of the retention plate may be sized to receive a center pin of the drive spindle such that in the non-operating position, the center pin forces the retention plate away from the data storage disc.

In another exemplary embodiment, the present invention provides a data storage system comprising a data storage cartridge and a disc drive. The data storage cartridge includes a shell defined by a cover and a base, a data storage disc maintained within the shell between the cover and the base, the data storage disc including a central portion, and a restraining mechanism which operates to restrain the central portion of the data storage disc against the shell when the data storage disc is in a non-operating position. The disc drive includes a drive spindle, wherein when the data storage disc is in an operating position, the restraining mechanism is disengaged from restraining the data storage disc by the drive spindle independent of a shutter mechanism.

The restraining mechanism is operably positioned between the data storage disc and the shell. The restraining mechanism includes a spring mechanism operably positioned between the shell and the data storage disc for biasing the data storage disc against the shell when the data storage disc is in a non-operating position. In one preferred embodiment, the spring mechanism is generally cup shaped.

The restraining mechanism may further include a retention mechanism positioned over the spring mechanism, wherein the spring mechanism biases the retention mechanism against the data storage disc when the data storage disc is in the non-operating position. The retention mechanism may be generally cup shaped. The data storage disc may include a disc substrate having a center hole, and a hub located at the center hole, wherein when the data storage disc is in a non-operating position, the retention mechanism contacts the hub.

The disc drive spindle may further include a first member and a second member, wherein when the data storage disc is in an operating position, the first member disengages the restraining mechanism, and the second member is operably coupled to the data storage disc. The first member may be coaxial with the second member. When the data storage disc is in the operating position, the first member does not rotate.

DETAILED DESCRIPTION OF THE INVENTION

Figure 1:
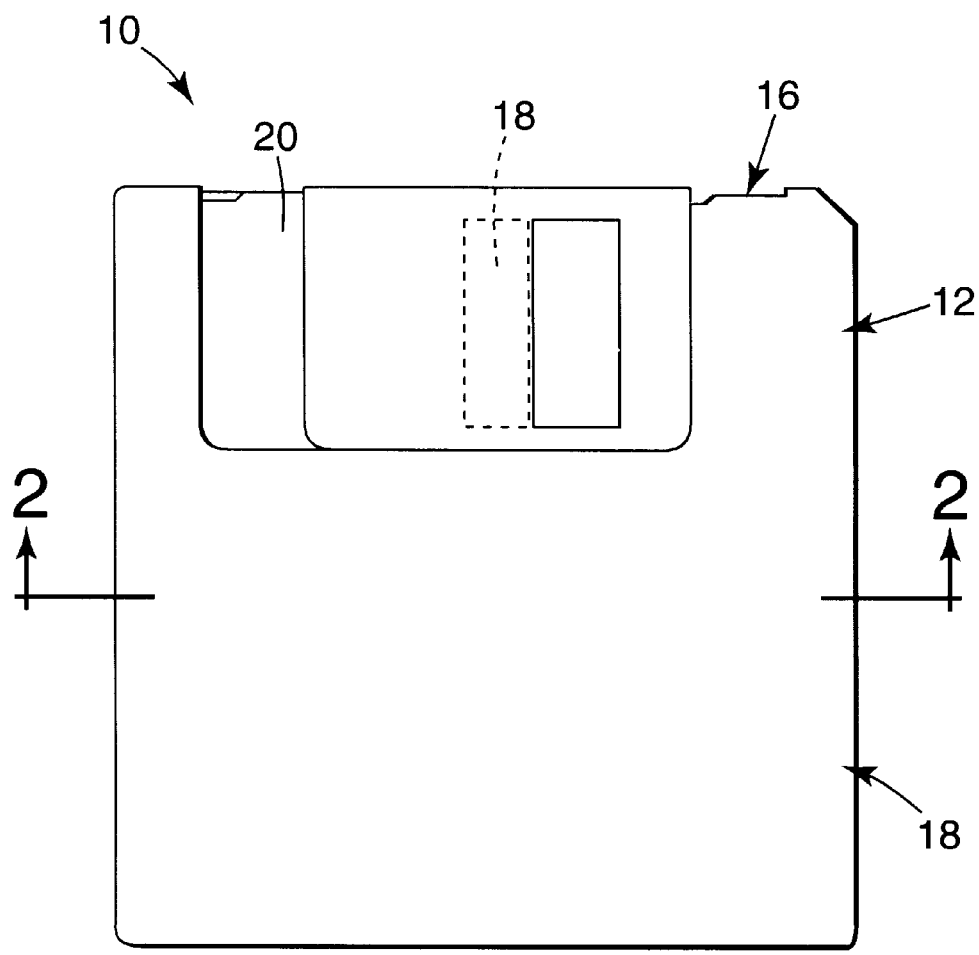
FIG. 1 is a plan view illustrating one exemplary embodiment of a data storage cartridge in accordance with the present invention, with a portion of the cover removed.

In FIG. 1, one exemplary embodiment of a data storage cartridge in accordance with the present invention is generally shown at 10. The data storage cartridge 10 includes a shell 12 and a data storage disc 14. The shell 12 is defined by a cover 16 and a base 18. The data storage disc 14 is centrally disposed within the shell 12 between the cover 16 and the base 18. The data storage cartridge 10 operates to safely restrain the data storage disc 14 from movement when the data storage cartridge 10 is not in use. A data storage cartridge is considered "not in use" when the data storage disc is not engaged by a disc reading mechanism, such as a disc player drive spindle, for rotation and reading of the data storage disc. As such, a data storage cartridge is considered "not in use" when the data storage cartridge is located in a disc drive, but not engaged by the disc reading mechanism.

Data storage cartridge 10 includes a sliding door or shutter mechanism 20 for providing access to the disc 14. For purposes of illustration, the shutter mechanism 20 is shown in a partially open state. When the data storage cartridge 10 is not located within a disc drive, the shutter mechanism 20 is normally closed. As described in greater detail below, the shutter mechanism 20 may be opened upon insertion of the data storage cartridge into a disc drive (not shown in FIG. 1). The shutter mechanism 20 closes upon removal of the cartridge 10 from the disc drive. Additionally, the shutter mechanism 20 can be opened manually.

Figure 2:
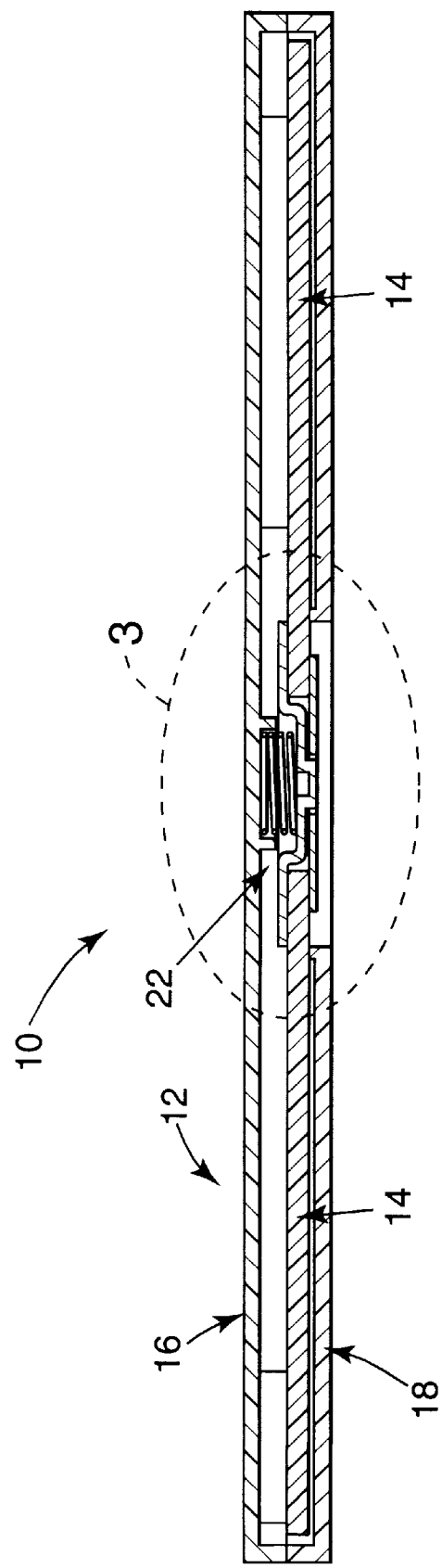
FIG. 2 is a cross-sectional view of a data storage cartridge taken along the line 2—2 of FIG. 1.

In FIG. 2, a cross-sectional view of the cartridge 10 in accordance with the present invention is generally shown. The cartridge 10 is shown in a non-operating state, prior to engagement with a disc reader or drive (not shown). The cartridge 10 in accordance with the present invention includes an anti-rattle or restraining mechanism 22 which operates to restrain the recording medium or disc 14 when the disc is in a non-operating state. As will be described later in the specification, when disc 14 is in an operating state, restraining mechanism 22 is disengaged from restraining the disc 14 within the cartridge shell 12, allowing rotation and use of the disc 14 within the disc drive.

The restraining mechanism 22 is disposed within the shell 12 between the cover 16 and the base 18. In operation, the restraining mechanism 22 operably engages the disc 14 and restrains the disc 14 against the shell 12 for safely restraining the disc 14 when the cartridge 10 is in a non-operating state. The restraining mechanism 22 safely restrains the disc 14 within the shell 12 in both an axial direction (i.e., a direction perpendicular to the data surface) and radial direction, without causing damage to data formatted on the disc.

Figure 3:
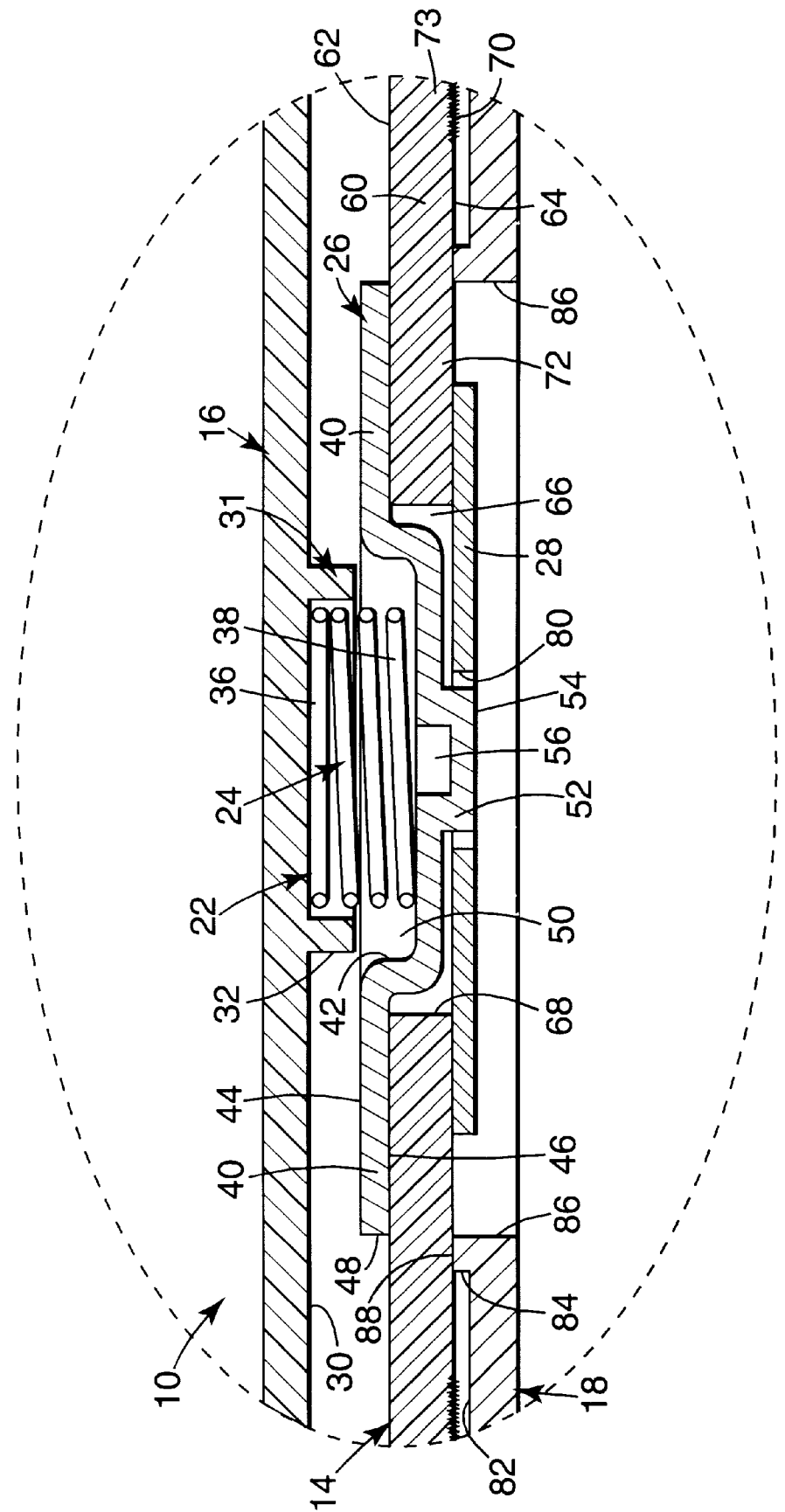
FIG. 3 is an enlarged, partial cross-sectional view of Area 3 of the data storage cartridge of FIG. 2, illustrating the data storage cartridge in a non-operating state.

In FIG. 3, an enlarged, partial cross-sectional view of the cartridge 10 is shown taken at Area 3 of FIG. 2. In one embodiment, the restraining mechanism 22 may include a spring mechanism or means 24 and a retention plate 26. As previously described, the cover 16 and the base 18 form the shell 12 (FIG. 1). The spring means 24 and the retention plate 26 are disposed within the cover 16 and the base 18. More particularly, the retention plate 26 is centrally positioned above the disc 14. The spring means 24 engages the cover 16 and the retention plate 26, biasing the retention plate 26 toward the disc 14. The disc 14, in turn, is biased toward the base 18.

The cover 16 includes an interior surface 30 and a spring mounting means 31. In one preferred embodiment, the spring mounting means 31 includes an annular flange extending from the interior surface 30. The annular flange 32 is configured to receive and maintain a portion of the spring means 24. Alternatively, the spring mounting means 31 can assume a wide variety of forms. For example, the spring mounting means 31 may be a groove formed in the interior surface 30 sized to maintain the spring means 24. Even further, the spring means 24 may be frictionally maintained along the interior surface 30.

The cover 16 may be made from generally rigid or hardened plastic. In one embodiment, the spring mounting means 31 is formed as an integral portion (molded) of the interior surface 30 such that the cover 16 is a singular piece. Alternatively, the spring mounting means 31 can be formed separately from the interior surface 30, and secured to the interior surface (for example, by an adhesive).

The spring means 24 is configured to bias the retention plate 26 and is preferably a compression spring having a first end 36 and a second end 38. The spring means 24 is sized to nest within the spring mounting means 31 of the cover 16. Thus, in one preferred embodiment the compression spring 24 has an outer diameter approximating an inner diameter of the annular flange 32 of the cover 16. In one exemplary embodiment, the compression spring 24 is made of a stainless steel material, and has a spring or force constant of one pound/foot. The compression spring 24 is preloaded in non-loading conditions to generate the requisite force constant.

The retention plate 26 may be preferably a generally circular disc having an outer region 40 and a central region 42. The outer region 40 is defined by a top 44, a bottom 46 and an edge 48. The central region 42 forms a spring receiving recess 50 and a shoulder 52. The shoulder 52 terminates at a face 54.

The outer region 40 may have a uniform thickness and extends radially from the central region 42. The central region 42 may preferably have a thickness greater than that of the outer region 40. Further, the central region 42 may be preferably sized to fit within a portion of the disk 14. Finally, the central region 42 may preferably have an overall thickness such that the distance from the lower surface 46 of the outer region 40 to the face 54 of the shoulder 52 is greater than a uniform thickness of the disk 14.

The spring receiving recess 50 is axially aligned within the central region 42 and is sized to receive the spring means 24. Further, as will be described in greater detail below, the spring receiving recess 50 is preferably configured to mate with the spring mounting means 31 of the cover 16. The shoulder 52 extends in an axial fashion from the central region 42, opposite the spring receiving recess 50. The face 54 of the shoulder 52 is preferably configured to abut or contact a portion of the restraining mechanism 22.

The retention plate 26 is preferably a singular device made of hardened polymeric material or plastic. Alternatively, other rigid materials, such as metal, can be used. Notably, the retention plate 26 as shown in FIG. 3 includes a central cavity 56. The central cavity 56 may be merely a manufacturing design choice to reduce manufacturing time and material, and therefore cost. Thus, in the exemplary embodiment shown, the central cavity 54 is in no way a required element of the retention plate 26. Further, while the retention plate 26 has been described as being preferably circular, other configurations are equally acceptable, such as a square, rectangle, dowel-shaped, cup-shaped, etc., so long as the outer region 40 is provided to contact the disc 14 (e.g., either the disc substrate or the hub) and the central region 42 is provided to receive the spring means 24.

The disc positioned within shell 12 is a medium capable of containing readable and/or writable data therein, such as a magnetic, optical, or magneto-optical disc. The disc may include a hub, or be a hubless disc. The data contained in/on the formatted surface of such disc may take on a variety of forms, such as "air incident" or "substrate incident" data formats as understood by one skilled in the art. Additionally, one skilled in the art, after reviewing this disclosure, may find other medium suitable for use with the cartridge having a restraining mechanism in accordance with the present invention.

In one exemplary embodiment shown, disc 14 includes a disc substrate 60 having a first side 62, a second side 64, a hub 66 and a center hole 68. The disc 14 includes a central portion 72, and an intermediate portion 73 located adjacent the central portion 72. In one preferred embodiment, the disc 14 is a high-capacity disc having a formatted surface 70 containing data therein created on the second side 64 adjacent a central portion 72 of the disc 14.

The data tracks located on a disc formatted surface in accordance with the preset invention may be centered with respect to the disc center hole, or for example, as shown in FIG. 3, the data tracks on formatted surface 70 may be centered relative to a hub coupled to the disc substrate, such as hub 66. Hub 66 may be centered relative to the data tracks using techniques as known in the art. As such, when disc 14 is engaged by a disc reader, the data tracks on formatted surface 70 are centered relative to the disc reader (for example, a disc reader drive spindle). It is recognized that a disc may include other features for aiding in centering the data tracks located on the formatted surface to a disc reader drive spindle.

In the exemplary embodiment shown, hub 66 is preferably an annular-shaped body having a center hole or axial passage 80. The axial passage 80 preferably has a diameter greater than a diameter of the shoulder 54 of the retention plate 26. Further, the hub 66 has an outer diameter greater than a diameter of the central hole 68 in the disc 14. Hub 28 is sized to mount against the central portion 72 of the second side 64 of the disc 14.

The hub 66 is preferably made of metal and is adhered to the disc 14. As previously described herein, hub 66 may be employed for centering data tracks on formatted surface 70 to the disc reader. As set forth in greater detail below, the metal hub 66 may also be employed to aid in coupling (e.g., magnetically coupling) the disc 14 to a portion of the disc reader, such as the drive spindle.

As previously described, base 18 is integrally attached to the cover 16. The base 18 includes an inner surface 82, an annular wall 84 and a central opening 86. The annular wall 84 extends from the inner surface 82 of the base 18 and terminates at a flat receiving face 88. Annular wall 84 preferably has a height which is greater than any protrusions or data tracks from the disc substrate 60 at the formatted surface 70. Finally, the annular wall 84 defines the central opening 86. The central opening 86 is sized to receive a portion of the disc reader 22 (such as the drive spindle) and, in the exemplary embodiment shown, has an outer diameter approximately equal to the central portion 72 of the disc 14. The base 18 is made of a material compatible with that of the cover 16, and is preferably hardened or rigid polymeric material or plastic.

The data storage cartridge 10 may be constructed as follows: The cover 16 and the base 18 are attached at outer edges to form the shell 12 (e.g., such as with an adhesive or using screws or screw posts). The remaining components are disposed within the shell 12. More particularly, the hub 66 is fixed to the second side 64 of the disc 14, such as by an adhesive. The disc 14 is centrally positioned within the shell 12 such that the alignment hub 66 is aligned axially with the center opening 86 of the base 18. The restraining mechanism retention plate 26 is positioned above the first side 62 of the disc 14. In this regard, the central region 42 of the retention plate 26 selectively nests within the center hole 68 of the disc 14. Finally, the restraining mechanism spring means 24 is positioned between the cover 16 and the retention plate 26. With this configuration, the first end 36 of the spring means 24 is mounted within the spring mounting means 31 of the cover 16. The second end 38 of the spring means 24 is secured within the spring receiving recess 50 of the retention plate 26.

Disk Cartridge In Non-Operating State

When the data storage cartridge 10 is in a non-operating state (as shown in FIG. 2 and FIG. 3), the restraining mechanism 22 operates to restrain the disc 14 within the cartridge 10 from both side-to-side (lateral) or radial movement, and axial movement. In the particular embodiment shown, the spring means 24 acts to securely retain the disc 14 against the base 18. As previously described, the spring means 24 preferably includes a compression spring preloaded to generate a one pound/foot force constant. When positioned between cover 16 and retention plate 26, the compression spring 24 forces the retention plate 26 away from the cover 16, toward the disc 14. The disc 14, which would otherwise be free to move within the shell 12, interacts with the retention plate 26 at the first side 62. More particularly, the outer region 40 of the retention plate 26 contacts the first side 62 of the disc 14. The central region 42 of the retention plate 26 is sized to fit within the center hole 68 of the disc 14, as previously described. Further, the shoulder 52 of the retention plate 26 is sized to pass through the axial passage 80 in the hub 66. Thus, the compression spring 24 forces the retention plate 26 into contact with the disc 14.

Once the bottom 46 of the outer region 40 of the retention plate 26 contacts the first side 62 of the disc 14, the compression spring 24 acts to force the disc 14, via the retention plate 26, toward the base 18. Thus, in the non-operating state shown in FIG. 2 and FIG. 3, the compression spring 24, via the retention plate 26, holds or locks the disc 14 against the annular wall 84 of the base 18. Notably the diameter of the edge 48 of the retention plate 26 is appropriately sized such that the retention plate 26 does not contact the central portion 72 of the disk 14 so as to avoid damaging any formatted area of the disc 14. Further, shoulder 54 is received within center hole 80. The disc restraining mechanism 22 is now locked or restrained from both axial (e.g., up and down), and radial movement.

The flat receiving face 88 of the annular wall 84 provides a relatively large area of contact between the annular wall 84 and the second side 64 of the disc 14. Further, the annular wall 84 is positioned such that in the non-operating state, the annular wall 84 is clear of, and therefore will not damage, the formatted surface 70 of the disc 14.

The annular wall 84 may also act as a debris barrier to protect the disc 14. In the non-operating state, the annular wall 84 configuration provides an additional benefit of sealing the shell 12 from potentially damaging dust and debris. A seal is formed between the flat receiving face 88 of the annular wall 84 and the second side 64 of the disc 14 such that air, which may contain undesirable debris, may not pass into the shell 12, or is inhibited from passing into the shell 12.

It should be recognized, however, that the annular wall 84 is not a required element of the present invention. For example, where the disc 14 is a type not having the formatted surface 70 on the second side 64, or where there is no concern for damage to the formatted surface 70, then the annular wall 84 is not required to provide clearance from the formatted surface 70. In order for debris to enter the shell 12, it must travel along a generally serpentine path as defined by the annular wall 84, and the disc 14, making it less likely (or almost impossible) for the debris to reach the formatted surface 70.

As previously described, the spring means 24 is preferably a compression spring. However, other devices are equally acceptable. For example, the spring means 24 can be an appropriately shaped piece of resilient, compressible material capable of generating an expansion force, such as hardened foam. Alternatively, the spring means 24 can assume a piston-cylinder type arrangement by which a constant force is placed on the retention plate 26 toward the disc 14. Regardless of form, the spring means 24 must be able to constantly direct and hold the disc 14, via the retention plate 26, to the base 18. Further, spring mechanism 24 may include a mechanism formed integral or which is part of spring mechanism 24 which provides the function of retention plate 26.

With the unique restraining mechanism 22 in accordance with the present invention, the disc 14 is restrained within the cartridge 10 when the cartridge 10 is in a non-operating state. Since the restraining mechanism 22 is not engaged or disengaged by the operation of the cartridge door 20 or upon insertion of the cartridge 10 into a drive, as such, when the cartridge 10 is located in a drive, and the drive is in a non-operating state, the restraining mechanism 22 continues to safely restrain the disc 14 from axial or radial movement within the cartridge shell 12.

Data Storage Cartridge in an Operating State

Figure 4:
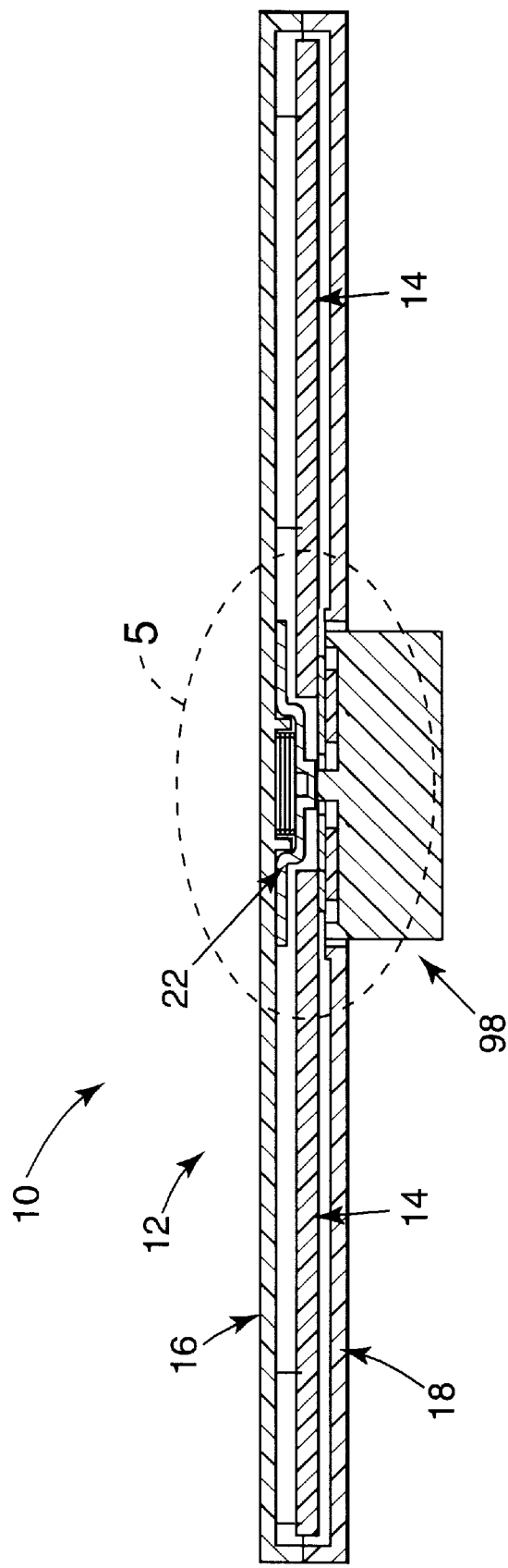
FIG. 4 is a cross-sectional view of a data storage cartridge in accordance with the present invention, illustrating the data storage cartridge engaged with a drive spindle in-an operating state.

In FIG. 4, the cartridge 10 in accordance with the present invention is shown in an operating state. Restraining mechanism 22 is disengaged, and the restraining mechanism 22 no longer restrains the disc 14 within the cartridge 10. As such, the disc 14 is allowed to freely rotate within the shell 12. In particular, restraining mechanism 22 is released from the disc 14 when the cartridge 10 is operated upon or engaged by a disc reader 98 (such as the drive spindle). As such, only when the cartridge 10 is in an operating state, is the restraining mechanism 22 released from the disc 14 and is the disc drive allowed to freely rotate the disc.

Figure 5:
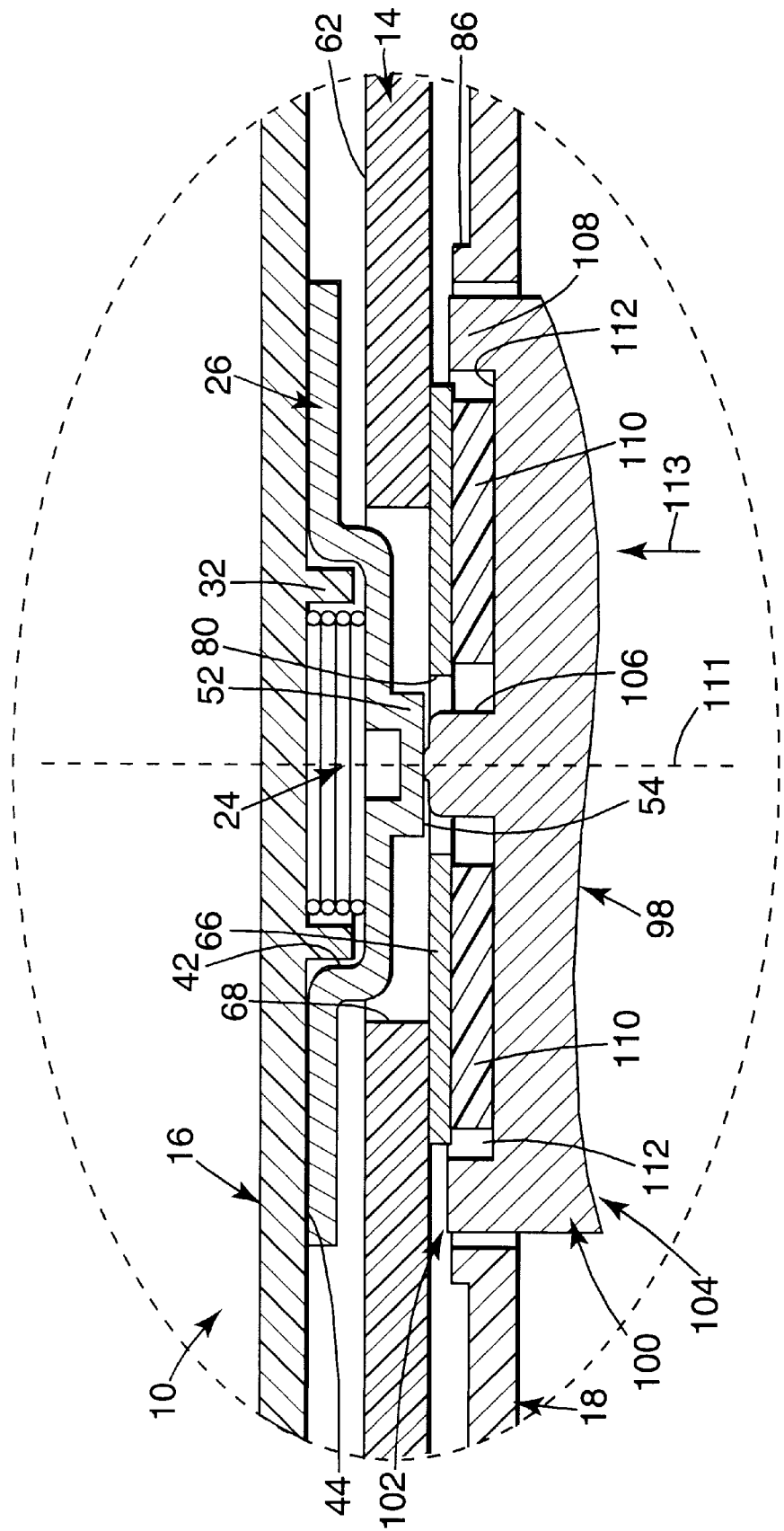
FIG. 5 is an enlarged, partial cross-sectional view of Area 5 of the data storage cartridge of FIG. 4.

In FIG. 5, an enlarged, partial cross-sectional view is shown of Area 5 indicated in FIG. 4. The disc reader 98 includes a drive spindle 100 having a first end 102 and a second end 104. The first end 102 contacts and engages the disc 14 and includes a center pin 106, a flange 108 and a coupling mechanism 110. The center pin 106 is generally cylindrically shaped, and extends from the first end 102. The center pin 106 is centered along the longitudinal axis of rotation of the drive spindle 100, indicated at 111. The flange 108 extends radially from the first end 102.

Drive spindle 100 further includes annular groove 112, as defined by center pin 106 and flange 108. Coupling mechanism 110 can be located adjacent the center pin 106 within annular groove 112, and aids in providing a coupling force between the drive spindle 100 and the disc 14. In one exemplary embodiment shown, coupling mechanism 110 is formed of a ferromagnetic material, such as a magnet positioned within the drive spindle 100 for providing electromagnetic coupling force between the hub 66 (otherwise secured to the disc 14) and the drive spindle 100. Alternatively, it is recognized that other methods may be used for coupling mechanism 110 to provide a coupling force between the hub 66 and the drive spindle 100, such as a vacuum.

In a preferred embodiment, the drive spindle 100, including the center pin 106, is preferably made from stainless steel. The center pin 106 is sized to precisely fit within the axial passage 80 of the hub 66. Similarly, the flange 108 is sized such that the flange 108 fits within the central opening 86 of the base 18. In the exemplary embodiment shown, hub 66 center hole 80 is centered on the disc 14 with respect to the disc formatted data tracks. Center hole 80 is precisely sized for receiving center pin 106 for centering/registration of the data tracks relative to the drive spindle 98.

In an operating state, the drive spindle 100 forces the restraining mechanism 22 away from the disc 14 upon engaging the data storage cartridge 10 (the movement of which is indicated by arrow 113). More particularly, after insertion of the data storage cartridge 10 into the disc reader 98 and generation of an appropriate activation command signal, the drive spindle 100 is maneuvered in an axial fashion to operably engage the disc 14 through the central opening 86 in the base 18. As the drive spindle 100 traverses through an axial path, the center pin 106 contacts the shoulder 52 at the face 54.

As the drive spindle 100 continues to move axially toward the cover 16, the center pin 106 overcomes the biasing force generated by the spring means 24 and directs the retention plate 26 away from the first side 62 of the disc 14. As the center pin 106 contacts the shoulder 52, the coupling mechanism 110 of the disc 14 couples hub 66 to drive spindle 98. Thus, the retention plate 26 is forced away from the base 18.

As the drive spindle 100 continues along an axial path toward the cover 16, the top 44 of the retention plate 26 is maneuvered into approximate contact with the interior surface 30 of the cover 16. Notably, the spring receiving recess 50 of the retention plate 26 is appropriately sized to nest about the spring mounting means 31 of the cover 16.

A magnetic coupling is created between the hub 66 and the coupling mechanism 110 of the drive spindle 100. Thus, in the operating state depicted in FIG. 5, the restraining mechanism retention plate 26 is clear of the disc 14. Further, the disc 14 is coupled to the drive spindle 100 such that rotation of the drive spindle 100 results in rotation of the disc 14 within the shell 12.

Figure 6:
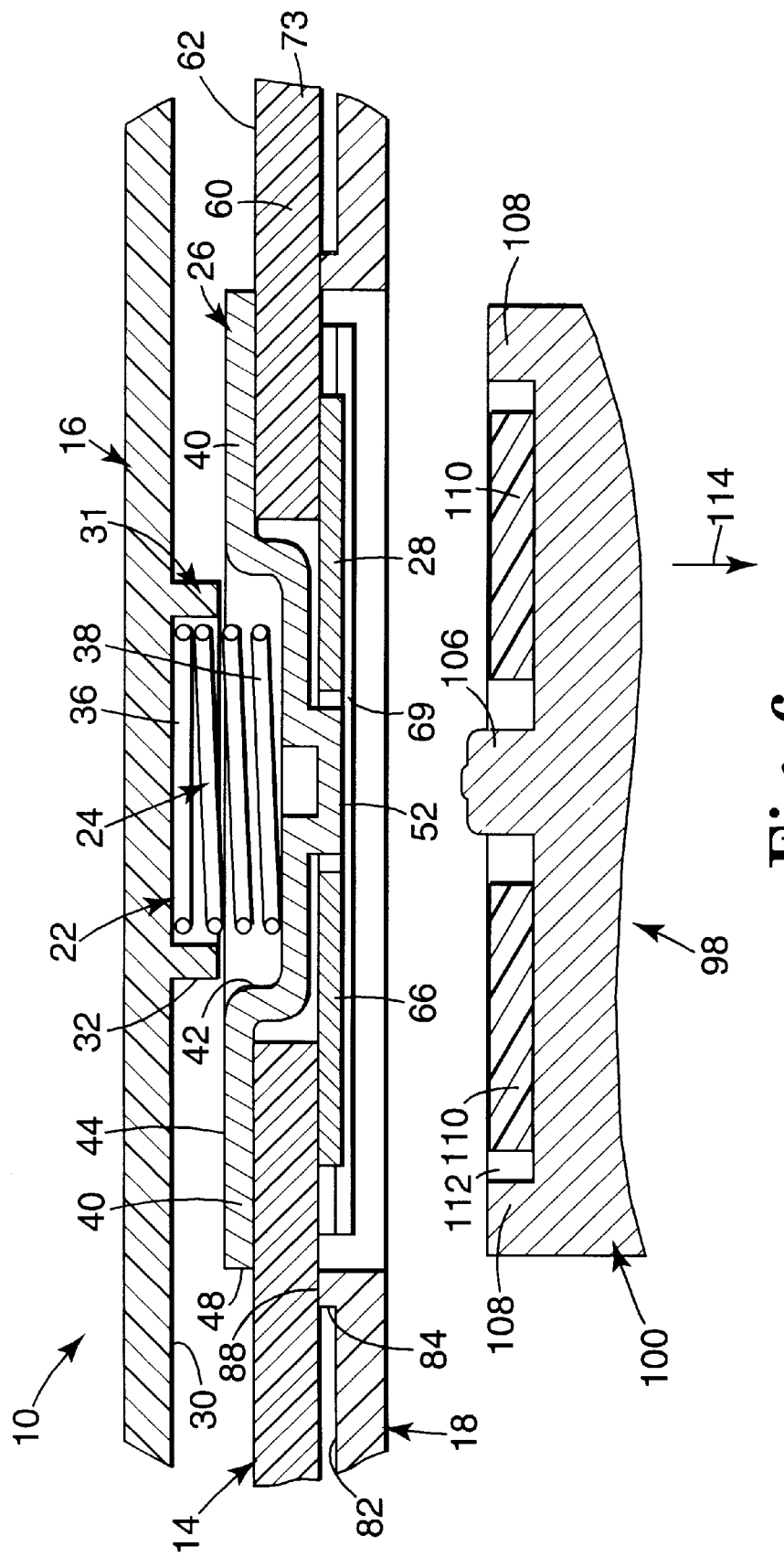
FIG. 6 is an enlarged, partial cross-sectional view of a data storage cartridge in accordance with the present invention, illustrating the cartridge disengaged with a drive spindle in a non-operating state.

Referring to FIG. 6, upon disengagement of the drive spindle 100, the restraining mechanism 22 again securely retains the disc 14 within the cartridge shell 16. In particular, as drive spindle 100 is withdrawn from engagement with data storage cartridge 10, indicated by directional arrow 114, restraining mechanism 22 again contacts and restrains disc 14 as previously described herein, safely securing the disc 14 within the data storage cartridge 10 against base 18.

Figure 7:
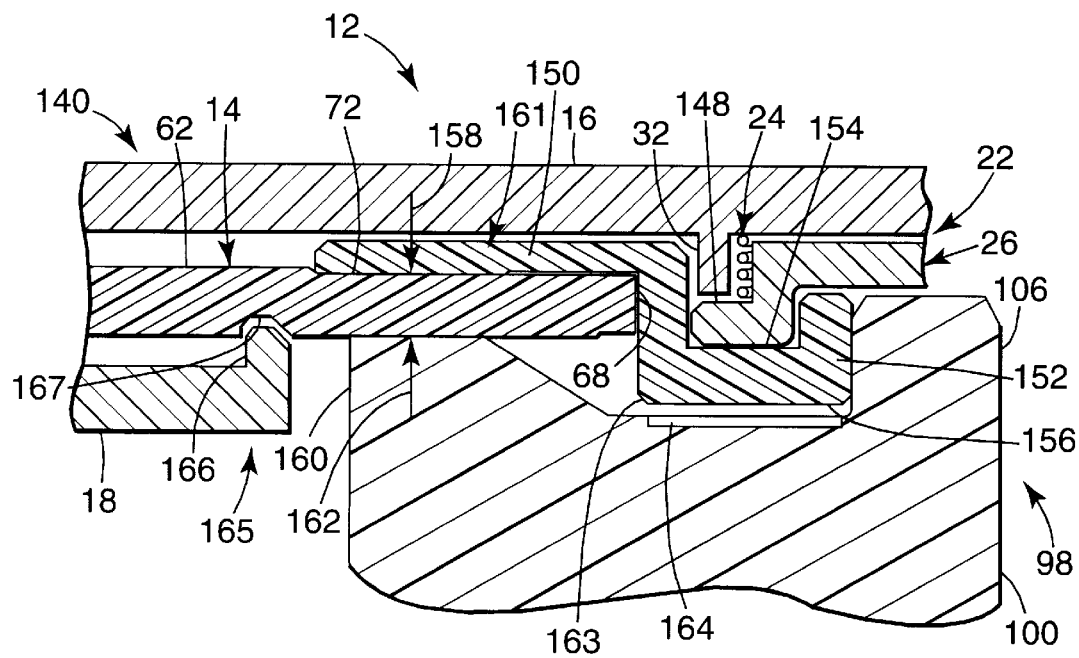
FIG. 7 is an enlarged, partial cross-sectional view of another exemplary embodiment of a data storage cartridge in accordance with the present invention.

In FIG. 7, a partial cross-sectional view of another exemplary embodiment illustrating a data storage cartridge in accordance with the present invention is generally shown at 140. The data storage cartridge 140 can be similar to the data storage cartridge 10, as previously described herein. As shown, the restraining mechanism 22 contacts a hub 161, but does not directly contact the disc substrate 60.

Restraining mechanism 22 includes a spring mechanism or means 144 and a retention plate 146 which can be similar to the spring mechanism or means 24 and the retention plate 26 as previously described herein. Further, retention plate 146 includes a contacting mechanism or means 148 for contacting restraining mechanism 22 with hub 161. In particular, in the exemplary embodiment shown, hub 161 includes a flange 150 and a coupling member 152. Hub 161 is secured to the disc substrate 60, such as by an adhesive, at flange 150 along the central portion 72 of the disc.

In the exemplary embodiment shown, coupling member 152 extends below disc central opening 68 and includes a first surface 154 and a second surface 156. The restraining mechanism 22 contacting mechanism 148 directly contacts the hub first surface 154, such that restraining mechanism 22 does not directly contact the disc substrate 62. The bias force normal to the disc substrate 62 produced by restraining mechanism 22 is translated from first surface 154 along hub 66 to flange 150 (indicated by normal force arrow 158). Preferably, spindle 100 is designed such that a spindle flange 160 is in alignment with the hub flange 150 during engagement of the drive spindle 100, indicated by spindle normal force arrow 162. Further, a hub coupling mechanism 163 may be attached to second surface 156, and drive coupling mechanism 164 may be positioned within drive recess 166, in alignment with hub coupling mechanism 163. Hub coupling mechanism 163 and drive coupling mechanism 164 may be similar to coupling mechanism 110, as previously described herein, and may be employed to aid in electromagnetically coupling the drive spindle 100 to disc 14 when data storage disc 14 is in an operating state.

The data storage cartridge restraining mechanism 22 may further include a locking mechanism 165. The locking mechanism 165 further locks or restrains the disc 14 in place when the data storage cartridge 140 is in a non-operating state. In the embodiment shown in FIG. 7, the locking mechanism 165 may include an annular wall 166 and a corresponding annular groove 167 capable of receiving the annular wall 166. In one preferred embodiment, the annular wall 166 extends above the data storage cartridge base 18, and the annular groove 167 extends mm below the surface of data storage disc 14. The annular groove 167 is located in alignment with annular wall 166.

In FIG. 7, the data storage cartridge 140 is shown in an operating state. As such, the restraining mechanism 22 is disengaged from locking the data storage disc 14 against the shell 12, and the drive spindle 100 is engaged with the disc 14. Further, the locking mechanism 165 is released from further locking the disc 14, and in particular, annular wall 166 is released from engagement with annular groove 167.

Figure 8:
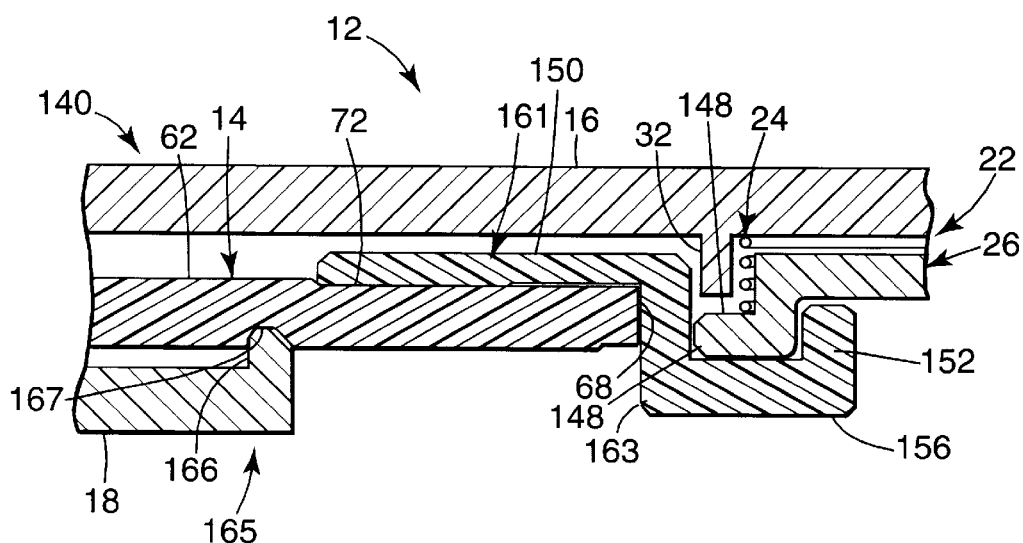
FIG. 8 is an enlarged, partial cross-sectional view of the data storage cartridge of FIG. 7 illustrating the cartridge in a non-operating state.

In FIG. 8, the data storage cartridge 140 is shown in a non-operating state. As such, the restraining mechanism 22 restrains the disc 14 from movement within the shell 12. For additional locking of the disc 14 within the shell 12, the annular wall 166 is positioned within annular groove 167. In the exemplary embodiment shown, the operating of restraining mechanism 22 locks the annular wall 166 within the annular groove 167.

Figure 9:
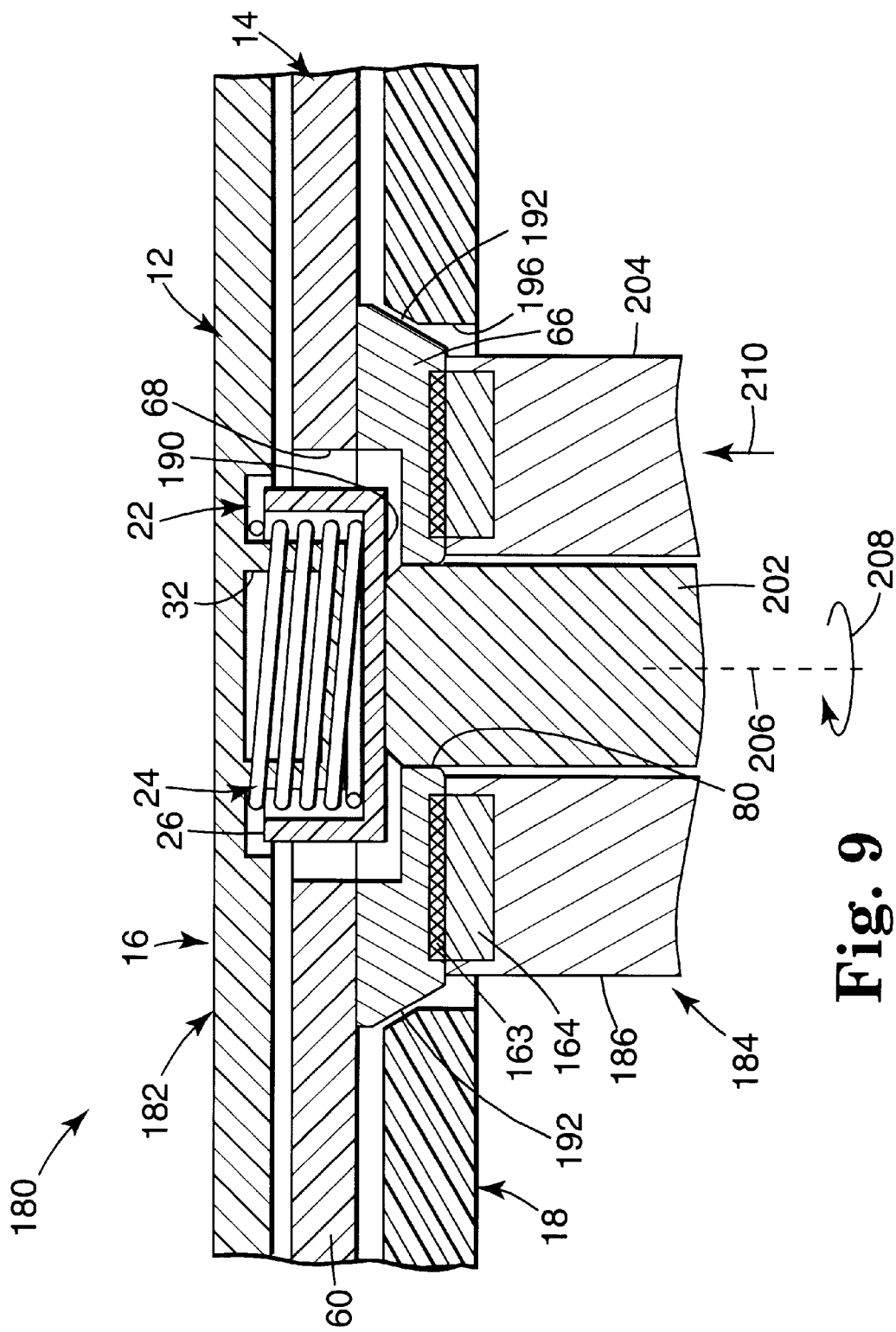
FIG. 9 is an enlarged partial cross-sectional view illustrating another exemplary embodiment of a data storage cartridge in accordance with the present invention, wherein the data storage cartridge in operating state.

In FIG. 9, a partial, cross-sectional view illustrating another exemplary embodiment of a data storage system having a data storage cartridge in accordance with the present invention 180 is shown in an operating position. The data storage system includes a data storage cartridge 182 and a disc drive 184 (illustrated by drive spindle 186), which can be similar to the data storage cartridges and disc drive previously described herein. Restraining mechanism 22 includes spring mechanism 24 and retention mechanism 26. In the exemplary embodiment shown, spring mechanism 24 is operably positioned between retention mechanism 26 and shell cover 16. Further, spring mechanism 24 is positioned about annular flange 32, and coupled to cover 16 and retention mechanism 26. In one preferred embodiment shown, retention mechanism is generally cup shaped, and includes an engagement surface 190 for engagement with a disc drive spindle. It is recognized that restraining mechanism 22 may comprise one unitary piece that performs the functions of retention mechanism 26 and spring mechanism 24.

Data storage disc 14 includes disc substrate 60 having center hole 68 as previously described herein. Hub 66 is positioned at center hole 168, and further includes center hole 80. Hub center hole 80 is centered relative to the formatted data tracks on data storage disc 14, for centering the data storage disc 14 to a drive spindle. Hub 66 further includes an annular hub coupling mechanism 163 which aligns with drive coupling mechanism 164 when data storage disc 14 is in an operating state.

Hub 66 further includes a hub aligning shoulder 192. The data storage cartridge base 18 includes a cartridge opening which is sized for allowing a corresponding drive spindle to extend therethrough. At cartridge opening 196, base 18 includes a cartridge aligning shoulder 198 which corresponds and aligns with hub aligning shoulder 192 when data storage disc 14 is in a non-operating state. Alternatively, it is recognized that a central portion of disc substrate 60 may rest against base 18.

Drive spindle 186 includes a center pin 202 and a disc engagement mechanism 204. In one preferred embodiment, center pin 202 and disc engagement mechanism 204 are coaxially aligned along drive spindle 186 center axis 206. Center pin 202 is not rotatable about center axis 206 and disengagement mechanism 204 is rotatable about center axis 206, indicated by disc drive rotation arrows 208.

In operation, disc drive spindle 186 is moved into an operating position or operating state, indicated by directional arrow 210. Center pin 202 operates to disengage restraining mechanism 22. Disc engagement mechanism 204 engages with the disc hub 66 at hub coupling mechanism 163 and drive coupling mechanism 164. During operating of drive spindle 186, center pin 202 remains stationary, maintaining restraining mechanism 22 disengaged from base 18. At the same time, disc engagement mechanism 204 rotates about center axis 206 for spinning of data storage disc 14.

Figure 10:
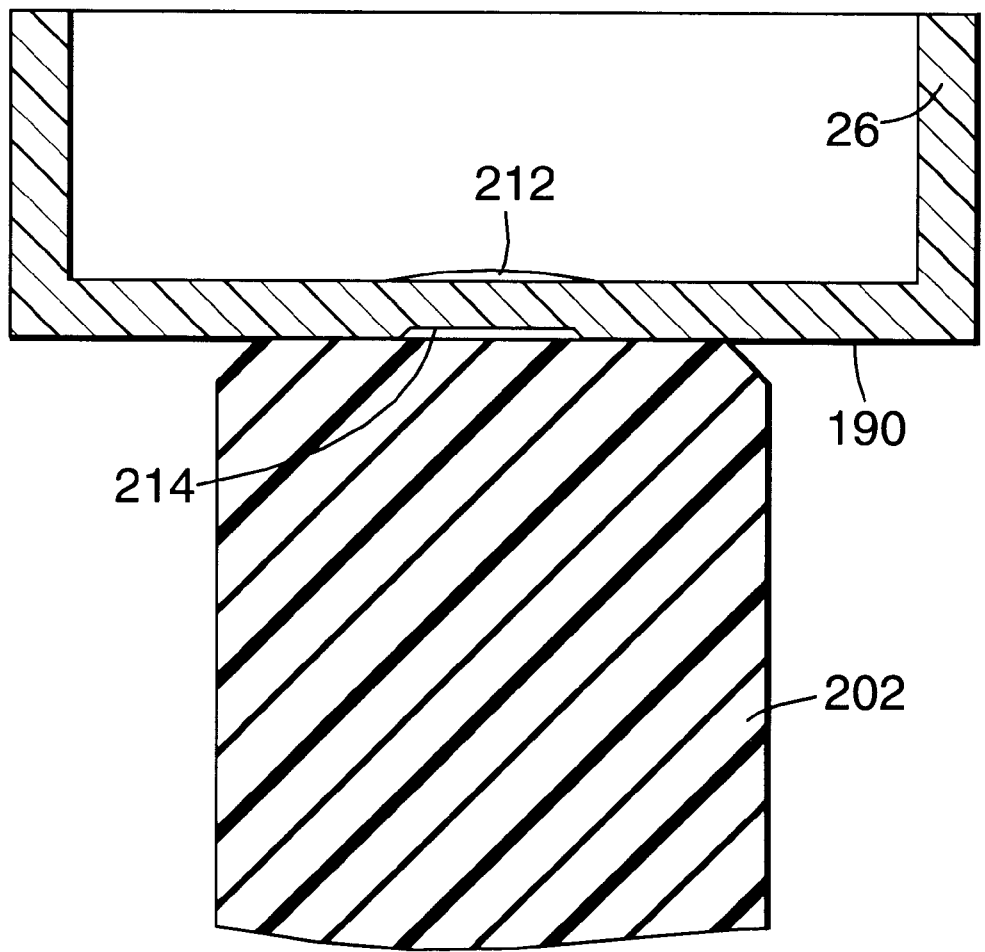
FIG. 10 is an enlarged, partial cross-sectional view illustrating interaction with the generally cup shaped retention plate and drive spindle of FIG. 9.

In FIG. 10, a partially enlarged, cross-sectional view illustrating interaction between center pin 202 and retention plate 26 is illustrated. As shown, retention mechanism 26 is a generally cup shaped member, wherein center pin 202 contacts retention mechanism 26 at engagement surface 190. In one preferred embodiment, center pin 202 is made of stainless steel and retention mechanism 26 is made of a molded polymeric material. As such, since center pin 202 remains stationary relative to retention mechanism 26, engagement of retention mechanism 26 by center pin 202 does not result in the generation of wear debris in data storage cartridge 182. It is also recognized that the generally cup shaped retention mechanism 26 may include other artifacts which may be a bi-product of the molding process, such as gate dimple 212 and gate recess 214 shown.

Figure 11:
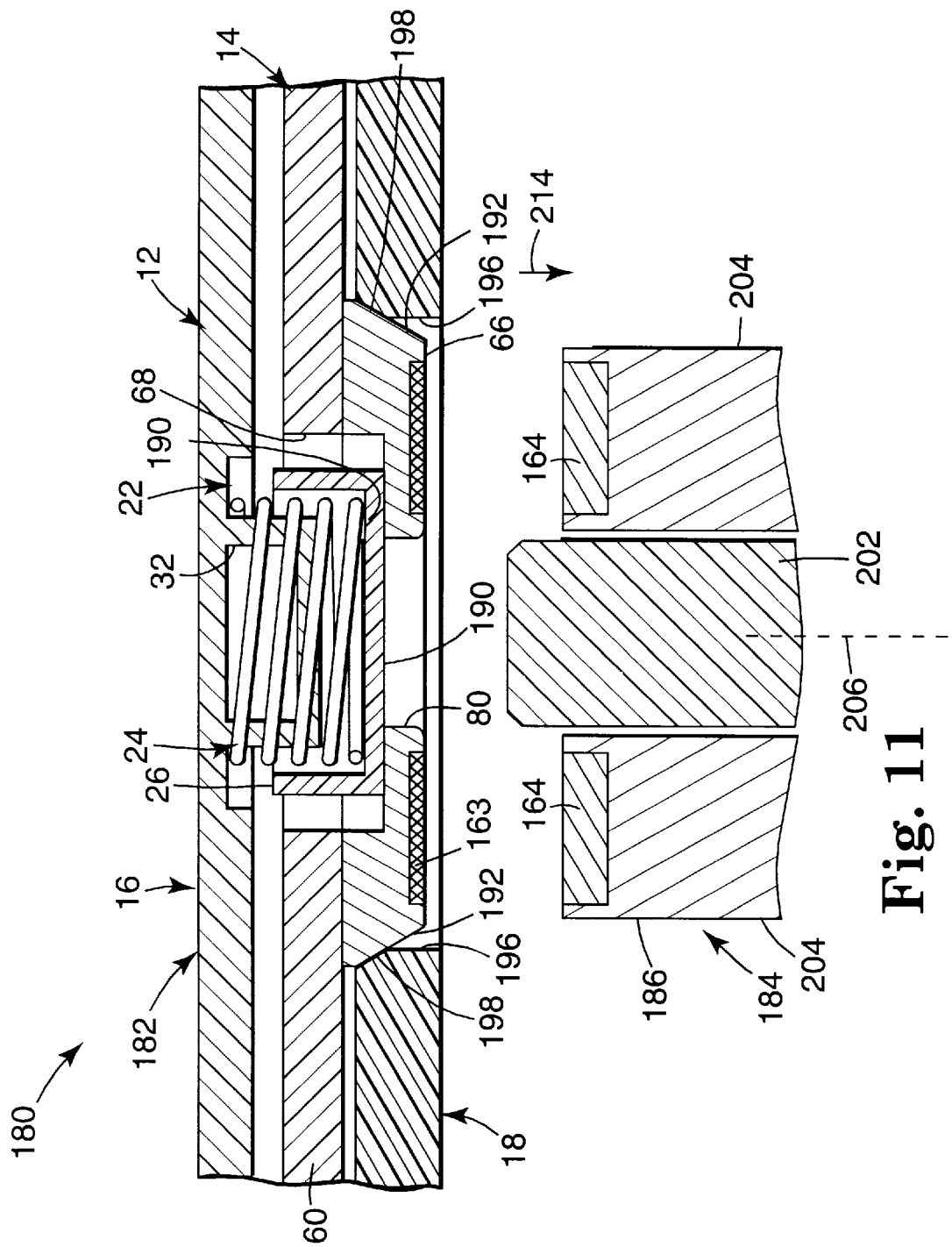
FIG. 11 is an enlarged, partial cross-sectional view of the data storage cartridge of FIG. 9 in a non-operating state.

In FIG. 11, data storage system 180 is shown, wherein data storage cartridge 182 is in a non-operating state or position. As such, drive spindle 186 is disengaged from data storage cartridge 182, indicated by directional arrow 214. In particular, as drive spindle 186 is moved in direction 214, restraining mechanism 22 operates to restrain data storage disc 14 against disc cartridge 16. In particular, spring mechanism 24 provides a biasing force to retention plate 26, which is positioned against hub 66. In turn, hub 66 is retained against base 18 at hub aligning shoulder 192 and cartridge aligning shoulder 198.

In summary, the data storage cartridge of the present invention provides a unique locking and restraining mechanism for securing a disc within a shell whenever the data storage cartridge is in a non-operating state. The restraining mechanism may contact the disc substrate or the disc hub. The restraining mechanism is employed to axially force the disc into contact with a portion of the base until the restraining mechanism is disengaged and the disc itself is engaged by the drive spindle. Thus, the restraining/locking mechanism of the present invention is at all times engaged regardless (i.e., independent) of whether the shutter mechanism of the data storage cartridge is opened or closed. The locking mechanism prevents both axial and radial rattle from damaging the sensitive disc substrate whenever the disc is in a non-operating state (i.e., not engaged by the drive spindle). This is particularly important for side-orientated disc drives that will otherwise allow the disc to slide or fall within the shell whenever the spindle is not engaging the disc.

Additionally, the locking mechanism of the present invention prevents undesirable and potentially damaging particles or debris from entering the shell. The disc is essentially sealed against the annular wall of the base so that air flow into the shell will not occur unless the locking mechanism is disengaged. Further, the retention plate block debris from entering the center hole in the disc when not in use. When the disc is in use (in an operating position), the restraining mechanism is disengaged and air flow is permitted. Thus, the locking mechanism of the present invention can be used in conjunction with a filter system so that when the locking mechanism is disengaged, filtered air would be sucked through the center hole of the disc as it is rotated by the spindle, facilitating a self-cleaning mechanism for the data storage cartridge.

Although the present invention has been described with referenced to preferred embodiments, workers skilled in the art will recognize that changes may be made in form and detail without departing from the spirit and scope of the invention. For example, the data storage cartridge having a restraining mechanism may be used for maintaining an optical or magnetic type disc. Similarly, the preferred embodiment includes a metal hub secured to the disc for facilitating magnetic coupling with the drive spindle. Other forms of coupling the disc to the drive spindle are acceptable, such that the metal hub is not a required element.

Additionally, the spring means has been depicted as preferably being mounted to the cover of the shell. Alternatively, the spring means can be mounted to the base and configured to constantly pull the retention plate toward the first side of the disc.

Finally, the retention plate has preferably been described as including an extending shoulder for receiving a center pin portion of the drive spindle. Other configurations may also be employed. For example, the shoulder can be eliminated with a drive spindle having a center pin extending beyond the flange extension. Alternatively, the center pin can be eliminated where the shoulder extends well beyond the second side of the disc.

What is claimed is:

1. A data storage cartridge for use with a drive having a drive spindle, the data storage cartridge comprising:

a shell defined by a cover and a base;

a data storage disc maintained within the shell between the cover and the base, the data storage disc including a central portion; and a restraining mechanism which operates to restrain the central portion of the data storage disc against the shell when the data storage disc is in a non-operating position; and wherein when the data storage disc is in an operating position, the restraining mechanism is disengaged from restraining the disc by the drive spindle independent of a shutter mechanism, wherein the restraining mechanism includes a spring mechanism operably positioned between the shell and the data storage disc for biasing the data storage disc against the shell when the data storage disk is in the non-operating position, the restraining mechanism further including a retention mechanism positioned over the spring mechanism, wherein the spring mechanism biases the retention mechanism against the data storage disc when the data storage disk is in the non-operating position, wherein the retention mechanism is generally cup-shaped and including outer walls surrounding the spring mechanism.

2. The data storage cartridge of claim 1, wherein the restraining mechanism axially and radially restrains the data storage disc within the shell.

3. The data storage cartridge of claim 1, wherein the data storage disc includes a disc substrate having a center hole, and a hub located at the center hole, wherein the restraining mechanism contacts the hub.

4. The data storage cartridge of claim 1, wherein the spring mechanism is mechanically coupled to the shell cover, and wherein the spring mechanism biases the central portion of the data storage disc against the base of the shell.

5. The data storage cartridge of claim 1, wherein the data storage disc is an optical disc.

6. A data storage cartridge for use with a drive having a drive spindle, the data storage cartridge comprising:

a shell defined by a cover and a base;

a data storage disc maintained within the shell between the cover and the base, the data storage disc including a central portion; and a restraining mechanism which operates to restrain the central portion of the data storage disc against the shell when the data storage disc is in a non-operating position; and wherein when the data storage disc is in an operating position, the restraining mechanism is disengaged from restraining the disc by the drive spindle independent of a shutter mechanism, wherein the restraining mechanism includes a spring mechanism operably positioned between the shell and the data storage disc for biasing the data storage disc against the shell when the data storage disk is in the non-operating position, the restraining mechanism further including a retention mechanism positioned over the spring mechanism, wherein the spring mechanism biases the retention mechanism against the data storage disc when the data storage disk is in the non-operating position, wherein the retention mechanism is generally cup-shaped and includes outer walls surrounding the spring mechanism, and wherein the drive spindle continuously contacts the retention mechanism during operation of the drive spindle.

7. A data storage cartridge for use in a disc drive having a drive spindle to store information on a data storage disc, the data storage cartridge comprising:

a shell defined by a cover and a base;

a data storage disc maintained within the shell, the data storage disc having a top surface and a bottom surface;

a retention plate positioned within the shell, wherein the retention plate is configured to selectively contact the data storage disc, wherein the retention plate is generally cup-shaped and including outer walls; and spring means operably coupled to the retention plate for biasing the retention plate into contact with the data storage disc such that in a first, non-operating position, the retention plate secures the disc substrate to the base and in a second, operating position, the retention plate releases the data storage disc from the base independent of a shutter mechanism, wherein the spring means is operably positioned within the generally cup-shaped retention plate and the outer walls surround the spring means.

8. The data storage cartridge of claim 7, wherein the cover includes a spring mounting means for maintaining an end of the spring means.

9. The data storage cartridge of claim 8, wherein the spring mounting means is an annular flange extending from the cover toward the base.

10. The data storage cartridge of claim 9, wherein the annular flange is centrally disposed on the cover.

11. The data storage cartridge of claim 9, wherein the annular flange is configured to frictionally maintain the spring means.

12. The data storage cartridge of claim 7, wherein the base includes an annular wall for selectively maintaining a portion of the bottom surface of the disc.

13. The data storage cartridge of claim 7, wherein the data storage disc is an optical recording media.

14. The data storage cartridge of claim 13, wherein the data storage disc further includes an alignment mechanism for registering the data storage disc with respect to the drive spindle.

15. The data storage cartridge of claim 7, wherein the base includes a central opening for allowing the drive spindle to interact with the data storage disc, the data storage cartridge further including:
a hub attached to the bottom surface of the data storage disc, wherein the hub is configured to extend into the central opening in the base.

16. The data storage cartridge of claim 7, wherein the spring means is a compression spring.

17. The data storage cartridge of claim 16, wherein the compression spring has a first end configured to engage the cover and a second end configured to engage the retention plate.

18. An improved data storage cartridge for interacting with a disc drive having a drive spindle, the data storage cartridge having a shell defined by a cover and a base, a data storage disc maintained within the shell, the data storage disc having a center hole, and a hub positioned at the center hole of the data storage disc and including an axial passage aligned with the center hole, the improvement comprising:
a restraining mechanism which operates to restrain the central portion of the data storage disc against the shell when the data storage disc is in a non-operating position; and wherein when the data storage disc is in an operating position, the restraining mechanism is disengaged from restraining the data storage disc by the drive spindle independent of a shutter mechanism, the restraining mechanism further including a retention plate selectively secured to a top surface of the data storage disc, wherein a portion of the retention plate is configured to selectively extend into the center hole of the data storage disc, wherein the retention plate is generally cup-shaped and including outer walls; and
spring means mounted to the retention plate for axially biasing the retention plate into selective engagement with the data storage disc, wherein the spring means is operably positioned within the generally cup-shaped retention plate, wherein the outer walls surround the spring means.

19. The improvement of claim 18, wherein the spring means is a compression spring having a first end associated with the cover and a second end associated with the retention plate.

20. The improvement of claim 18, wherein the data storage disc is an optical disc media having an alignment means.

21. A data storage system comprising:
a data storage cartridge including a shell defined by a cover and a base, a data storage disc maintained within the shell between the cover and the base, the data storage disc including a central portion, and a restraining mechanism which operates to restrain the central portion of the data storage disc against the shell when the data storage disc is in the non-operating position, wherein the restraining mechanism includes a spring mechanism operably positioned between the shell and the data storage disc for biasing the data storage disc against the shell when the data storage disk is in the non-operating position, the restraining mechanism further including a retention restraining mechanism positioned over the spring mechanism, wherein the spring mechanism biases the retention mechanism against the data storage disc when the data storage disk is in the non-operating position, wherein the retention mechanism is generally cup-shaped and including outer walls, wherein the outer walls surround the spring mechanism; and
a disc drive including a drive spindle, wherein when the data storage disc is in an operating position the restraining mechanism is disengaged from restraining the data storage disc by the drive spindle independent of a shutter mechanism.

22. The data storage system of claim 21, wherein the spring mechanism is generally cup shaped.

23. The data storage system of claim 21, wherein the data storage disc includes a disc substrate having a center hole, and a hub located at the center hole, wherein when the data storage disc is in the non-operating position, the retention mechanism contacts the hub.

24. A data storage system comprising:
a data storage cartridge including a shell defined by a cover and a base, a data storage disc maintained within the shell between the cover and the base, the data storage disc including a central portion, and a restraining mechanism which operates to restrain the central portion of the data storage disc against the shell when the data storage disc is in a non-operating position, wherein the restraining mechanism includes a spring mechanism operably positioned between the shell and the data storage disc for biasing the data storage disc against the shell when the data storage disc is in the non-operating position, the restraining mechanism further including a retention mechanism positioned over the spring mechanism, wherein the spring mechanism biases the retention mechanism against the data storage disc when the data storage disc is in the non-operating position, wherein the retention mechanism is generally cup-shaped and including outer walls surrounding the spring mechanism; and
a disc drive including a drive spindle, wherein when the data storage disc is in an operating position the restraining mechanism is disengaged from restraining the data storage disc by the drive spindle independent of a shutter mechanism, and wherein the disc drive spindle further comprises a first member and a second member, wherein when the data storage disc is in the operating position, the first member disengages the restraining mechanism and the second member is operably coupled to the data storage disc.

25. The data storage system of claim 24, wherein the first member is coaxial with the second member.

26. A data storage system comprising:

a data storage cartridge including a shell defined by a cover and a base, a data storage disc maintained within the shell between the cover and the base, the data storage disc including a central portion, and a restraining mechanism which operates to restrain the central portion of the data storage disc against the shell when the data storage disc is in a non-operating position; and a disc drive including a drive spindle, wherein when the data storage disc is in an operating position the restraining mechanism is disengaged from restraining the data storage disc by the drive spindle independent of a shutter mechanism, wherein the disc drive spindle further comprises a first member and a second member positioned circumferentially surrounding the first member, wherein when the data storage disc is in an operating position, the first member disengages the restraining mechanism and the second member is operably coupled to the data storage disc at the central portion and is rotated about the first member;

wherein when the data storage disc is in the operating position, the first member does not rotate, and wherein the first member continuously contacts the restraining mechanism during operation of the drive spindle.

27. In a disc drive assembly, the improvement comprising a drive spindle insertable through a center hole of a data storage disc positioned within a data storage cartridge shell having a shell center hole, the drive spindle including a stationary portion and a rotatable portion which extend through the shell center hole, the rotatable portion including a mechanism for operable engagement of a hub having a hub center hole, the hub positioned over the center hole of the data storage disc, wherein the stationary portion is coaxial with the rotatable portion, and wherein the stationary portion is a center pin which extends through the hub center hole and the center hole of the data storage disc, and wherein when the drive spindle is in operation, the stationary portion remains stationary and the rotatable portion is rotated about the stationary portion.

* * * * *